US006938297B2

(12) United States Patent
Park et al.

(10) Patent No.: US 6,938,297 B2
(45) Date of Patent: Sep. 6, 2005

(54) WIPER ASSEMBLY WITH ARM HEAD LOCKING MEMBER

(75) Inventors: Wi Yeong Park, Incheon (KR); Hui Jea An, Incheon (KR)

(73) Assignee: Dongyang Mechantronics Corp., Incheon (KR)

( * ) Notice: Subject to any disclaimer, the term of this patent is extended or adjusted under 35 U.S.C. 154(b) by 0 days.

(21) Appl. No.: 10/877,309

(22) Filed: Jun. 25, 2004

(65) Prior Publication Data
US 2005/0120503 A1 Jun. 9, 2005

(30) Foreign Application Priority Data

Dec. 6, 2003 (KR) ...................... 10-2003-0088421

(51) Int. Cl.$^7$ ................................................. B60S 1/34
(52) U.S. Cl. ............................... 15/250.34; 15/250.352
(58) Field of Search ...................... 15/250.34, 250.351, 15/250.352

(56) References Cited

U.S. PATENT DOCUMENTS

| | | | | |
|---|---|---|---|---|
| 2,320,660 A | * | 6/1943 | Schaal ...................... 15/250.34 |
| 2,365,251 A | * | 12/1944 | Curtiss ..................... 15/250.34 |
| 2,832,982 A | * | 5/1958 | Parkes ...................... 15/250.34 |
| 2,994,900 A | * | 8/1961 | Smithers ................... 15/250.34 |
| 3,011,200 A | * | 12/1961 | Bignon ..................... 15/250.34 |
| 3,016,766 A | * | 1/1962 | Hoyler ....................... 384/276 |
| 3,247,541 A | * | 4/1966 | Deutscher ................ 15/250.34 |
| 4,050,832 A | * | 9/1977 | Stratton et al. ............. 403/321 |
| 5,634,235 A | * | 6/1997 | Hultquist et al. ........ 15/250.34 |

FOREIGN PATENT DOCUMENTS

| | | | | |
|---|---|---|---|---|
| DE | 2121112 | * | 11/1972 | .............. 15/250.34 |
| DE | 2356606 | * | 5/1975 | .............. 15/250.34 |
| GB | 1381154 | * | 1/1975 | .............. 15/250.34 |

* cited by examiner

Primary Examiner—Gary K. Graham
(74) Attorney, Agent, or Firm—Volpe and Koenig, P.C.

(57) ABSTRACT

A wiper assembly for use in vehicles is provided, including a shaft which is connected to a driving motor via a linkage and rotated by the driving motor, an arm head including a shaft hole into which the shaft is inserted, an arm having one end combined with the arm head by a rotating shaft and rotatable about the rotating shaft and the other end combined with a wiper blade which wipes a window of a vehicle, a locking member which is supported by the arm head and movable between a locking location where the locking member is locked in the shaft so that the shaft cannot be separated from the shaft hole of the arm head and an unlocking location where the locking member is unlocked from the shaft so that the shaft can be separated from the shaft hole of the arm head, and a locking member moving unit which moves in gear with a rotation of the arm so as to move the locking member between the locking location and the unlocking location. Accordingly, the shaft and the arm head of the wiper assembly can be simply combined with each other and separated from each other.

9 Claims, 13 Drawing Sheets

WIPER ASSEMBLY WITH ARM HEAD LOCKING MEMBER

BACKGROUND OF THE INVENTION

This application claims the benefit of Korean Patent Application No. 2003-88421, filed on Dec. 6, 2003, in the Korean Intellectual Property Office, the disclosure of which is incorporated herein in its entirety by reference.

1. Field of the Invention

The present invention relates to a wafer assembly, and more particularly, to a wiper assembly designed to simply combine or separate a shaft with or from an arm head.

2. Description of the Related Art

A wafer assembly is a part of a system for cleaning the surface of a window of a vehicle. Referring to FIGS. 1 and 2, a conventional wiper assembly 100 includes a shaft 110, an arm head 120, and an arm 130 in order to clean a window 200 of a vehicle. The shaft 110 is connected to a driving motor 102 via a linkage 104 and rotated by the driving motor 102. The arm head 120 has a shaft hole 122, into which the shaft 110 is inserted, and rotates with a rotation of the shaft 110. One end of the arm 130 is combined with the arm head 120 by a rotating shaft 132 and pivotable about the rotating shaft 132, and the other end is combined with a wiper blade 134 which wipes the window 200.

A coupling spring 136 is installed between the arm head 120 and the arm 130. The coupling spring 136 contributes to closely adhering the wiper blade 134 to the window 200. More specifically, the coupling spring 136 is installed such that when a user pivots the arm 130 about the rotating shaft 132 so as to be distant from the window 200 and folds the arm 130 to make an angle equal to or greater than a predetermined angle, the folded state can be maintained. When the arm 130 making an approximately straight line with the arm head 120 is folded so as to be distant from the window 200, and the folded state is maintained as described above, a user can conduct operations, such as wiping of the window 200 or replacement of the wiper blade 134 with a new one.

The arm head 120, to which the arm 130 is coupled, is combined with the shaft 110, which is connected to the driving motor 102 via the linkage 104 and rotates with a rotation of the driving motor 102. The combination of the arm head 120 with the shaft 110 must be strong because a high rotating force of the driving motor 102 must be delivered to the arm head 120. At the same time, a method of combining or separating the arm head 120 with or from the shaft 110 must be simple.

The conventional wiper assembly 100 uses a locking member 140 to combine or separate the arm head 120 with or from the shaft 110. The locking member 140 rotatably fits onto a first protrusion 124 formed in the arm head 120 and is elastically biased toward the shaft 110 by a coil spring 160 installed between the locking member 140 and the arm head 120. One end of the coil spring 160 is fixed into a spring notch 142 of the locking member 140, and the other end is fixed to the arm head 120. A cover 150 is installed on a side of the locking member 140 opposite to the arm head 120 and fixed to a pair of second protrusions 126, protruding from the arm head 120, and the first protrusion 124 using screws 152. A stopper 144 is formed on one end of the locking member 140.

In the conventional wiper assembly 100 having such a structure, the shaft 110 is inserted into the shaft hole 122 of the arm head 120 using the following method. First, a shaft head 112 approaches the shaft hole 122. Next, the locking member 140 that blocks the shaft hole 122 is rotated about the first protrusion 124 while resisting the elasticity of the coil spring 160 so that the locking member 140 is removed from the entrance of the shaft hole 122. While the state of the locking member 140 unblocking the shaft hole 122 is being kept, the shaft head 112 is inserted into the shaft hole 122. Finally, when the power applied to the locking member 140 is removed, the locking member 140 rotates back toward the shaft 110 because of a restoring force of the coil spring 160, and one end of the locking member 140 is placed under the shaft head 112 such that the shaft 110 is not separated from the shaft hole 122. On the other hand, the shaft 110 can be separated from the arm head 120 by performing the above-described assembling steps in an opposite order. More specifically, the locking member 140 is rotated to be distant from the shaft 110 by resisting the elasticity of the coil spring 160. At this time, the shaft 110 is separated from the shaft hole 122.

Since the shaft 110 in the conventional wiper assembly 100 is inserted into the shaft hole 122 of the arm head 120 while an operator is maintaining the state of the locking member 140 being rotated, the operator must use both hands. Also, since a strongly elastic coil spring should be used to keep a strong combination between the shaft 110 and the arm head 120, rotating the locking member 140 itself will be hard. Furthermore, average consumers other than skilled workers may not combine or separate the shaft 110 with or from the arm head 120.

SUMMARY OF THE INVENTION

The present invention provides a wiper assembly designed to simply combine or separate a shaft with or from an arm head.

According to an aspect of the present invention, there is provided a wiper assembly including a shaft, an arm head, an arm, a locking member, and a locking member moving unit. The shaft is connected to a driving motor via a linkage and rotated by the driving motor. The arm head includes a shaft hole into which the shaft is inserted. The arm has one end combined with the arm head by a rotating shaft and rotatable about the rotating shaft and the other end combined with a wiper blade which wipes a window of a vehicle. The locking member is supported by the arm head and movable between a locking location where the locking member is locked in the shaft so that the shaft cannot be separated from the shaft hole of the arm head and an unlocking location where the locking member is unlocked from the shaft so that the shaft can be separated from the shaft hole of the arm head. The locking member moving unit moves in gear with a rotation of the arm so as to move the locking member between the locking location and the unlocking location.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 3:
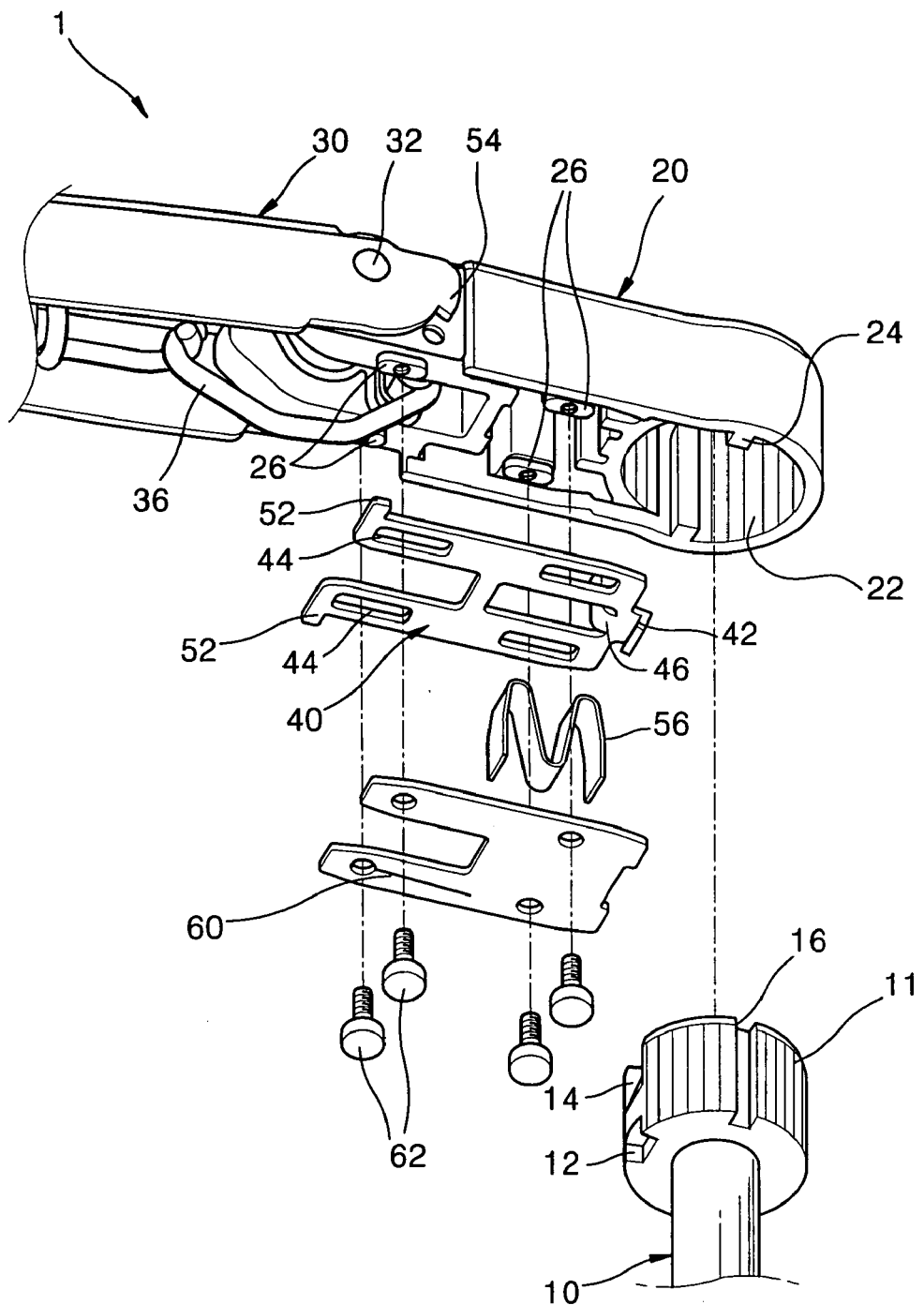
FIG. 3 is an exploded perspective view of a wiper assembly according to an embodiment of the present invention when viewed from the bottom of the wiper assembly.
Figure 4:
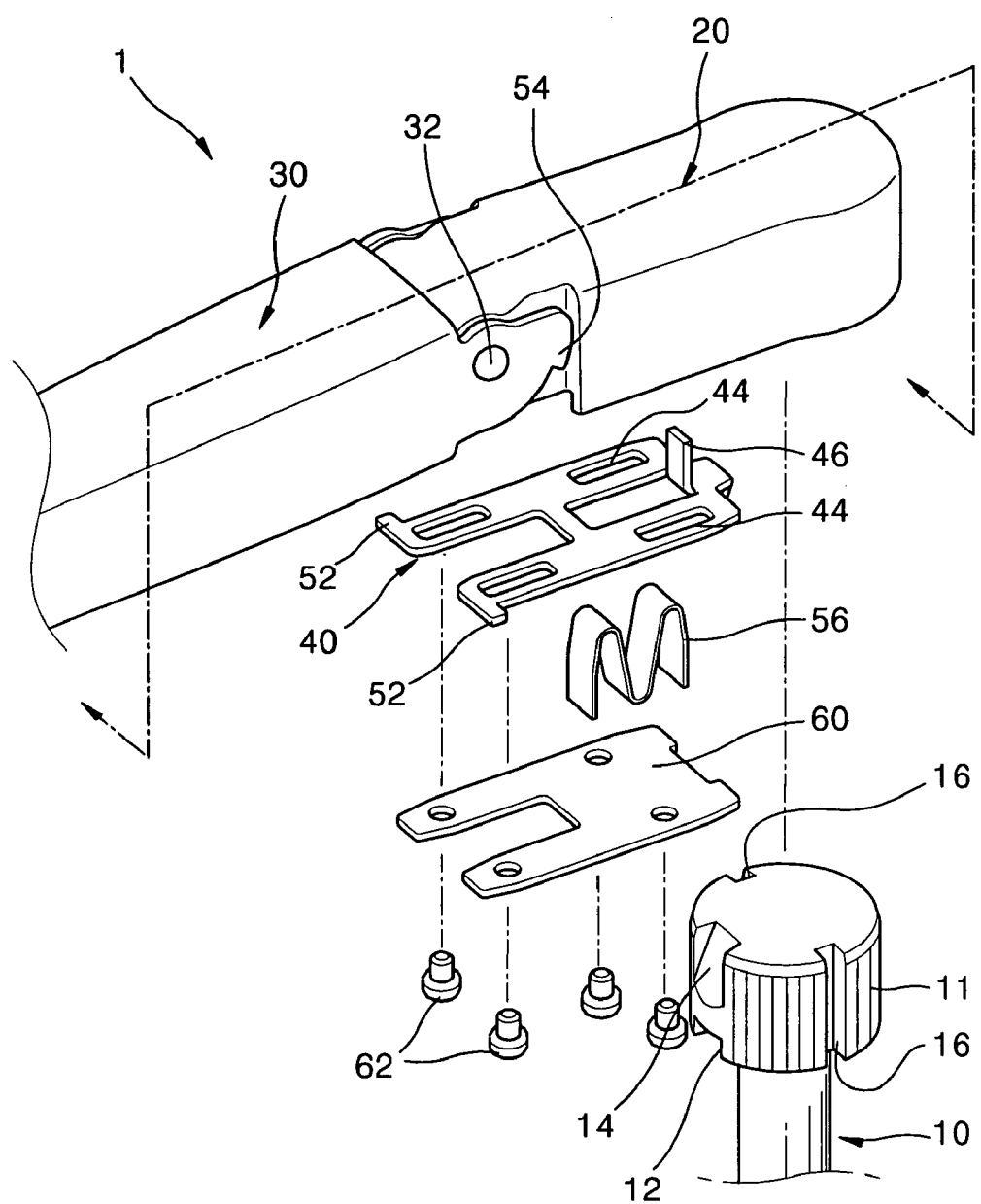
FIG. 4 is an exploded perspective view of the wiper assembly of FIG. 3 viewed from the top.

FIGS. 3 and 4 are exploded perspective views of a wiper assembly 1 according to an embodiment of the present invention when viewed from the bottom and top, respectively. Referring to FIGS. 3 and 4, the wiper assembly 1 includes a shaft 10, an arm head 20, a locking member 40, a locking member moving unit, and a cover 60.

Figure 1:
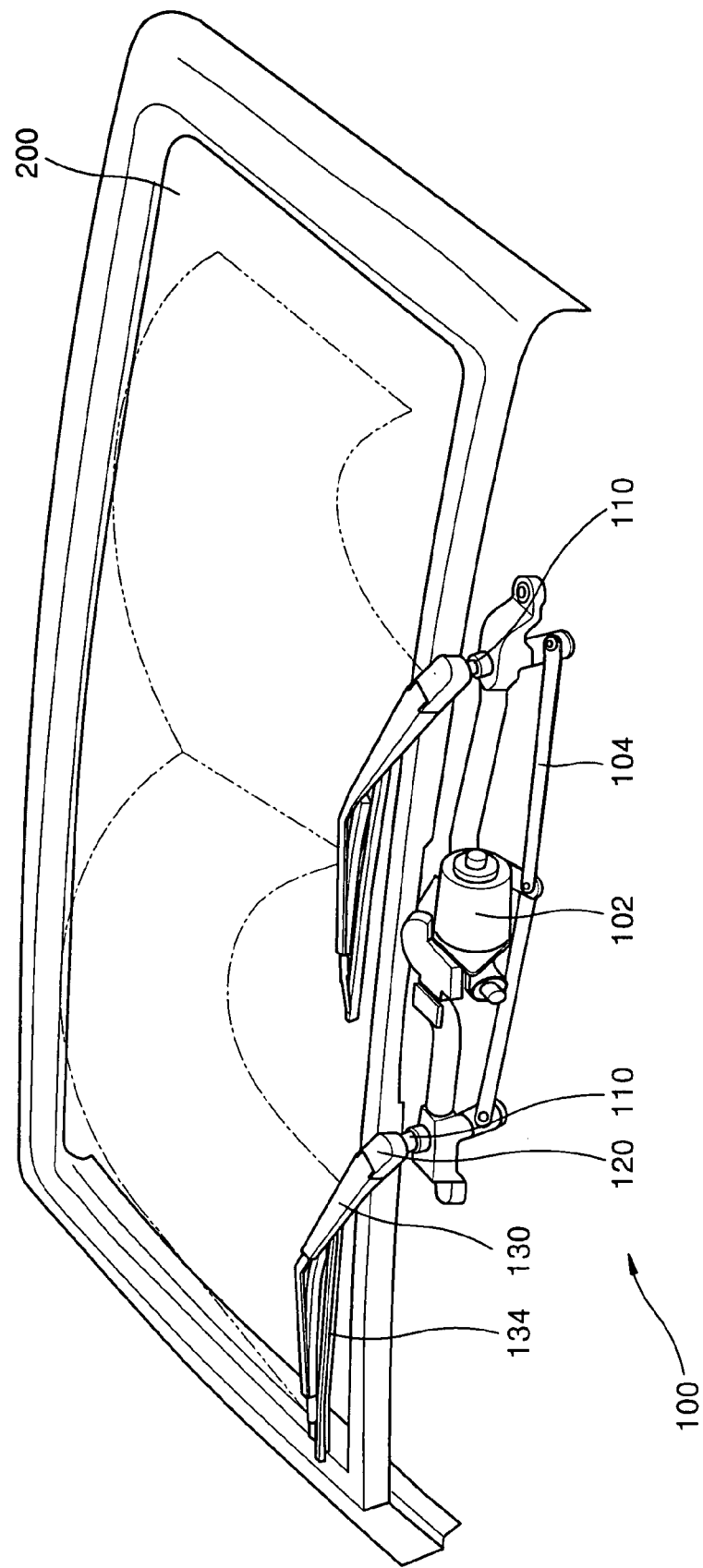
FIG. 1 is a schematic view illustrating the state of a conventional wiper assembly being used.
Figure 2:
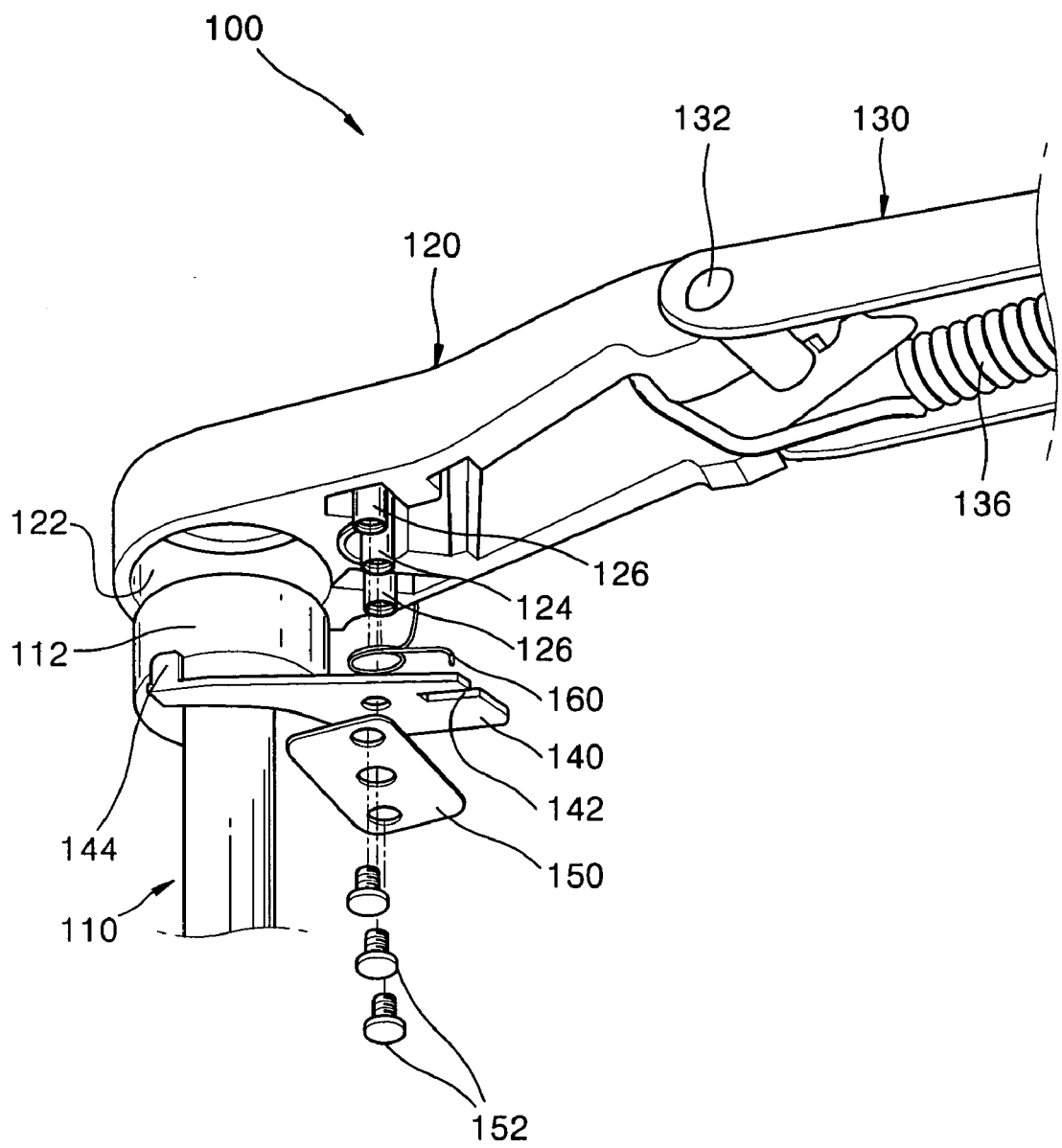
FIG. 2 is an exploded perspective view illustrating a combination of an arm head with a shaft of FIG. 1.

The shaft 10 is connected to a driving motor (not shown) using a linkage (not shown) so as to be rotated and includes a notch 12, an aslant guide 14, and a pair of key grooves 16. The driving motor and the linkage are the same as those of the conventional wiper assembly of FIG. 1.

The notch 12 is formed in a shaft head 11, which is formed on the upper surface of the shaft 10 and has a diameter greater than that of the shaft 10. The aslant guide 14 is formed above the notch 12. In other words, the line of the aslant guide 14 and the notch 12 is parallel to the axial line of the shaft 10. As shown in FIG. 4, the aslant guide 14 is inclined toward the center of the shaft 10. The key grooves 16 are formed on the shaft head 11 along the length direction of the shaft 10. The outer lateral surface of the shaft head 11 of the shaft 10 is knurled.

Although the shaft head 11 is formed on the shaft 10 in the embodiment of FIGS. 3 and 4, the notch 12, the shaft head 11, which is wider than the shaft 10, may not be formed on the shaft 10, and thus the aslant guide 14, and the key groove 16 may be formed directly on the upper part of the shaft 10.

Figure 5:
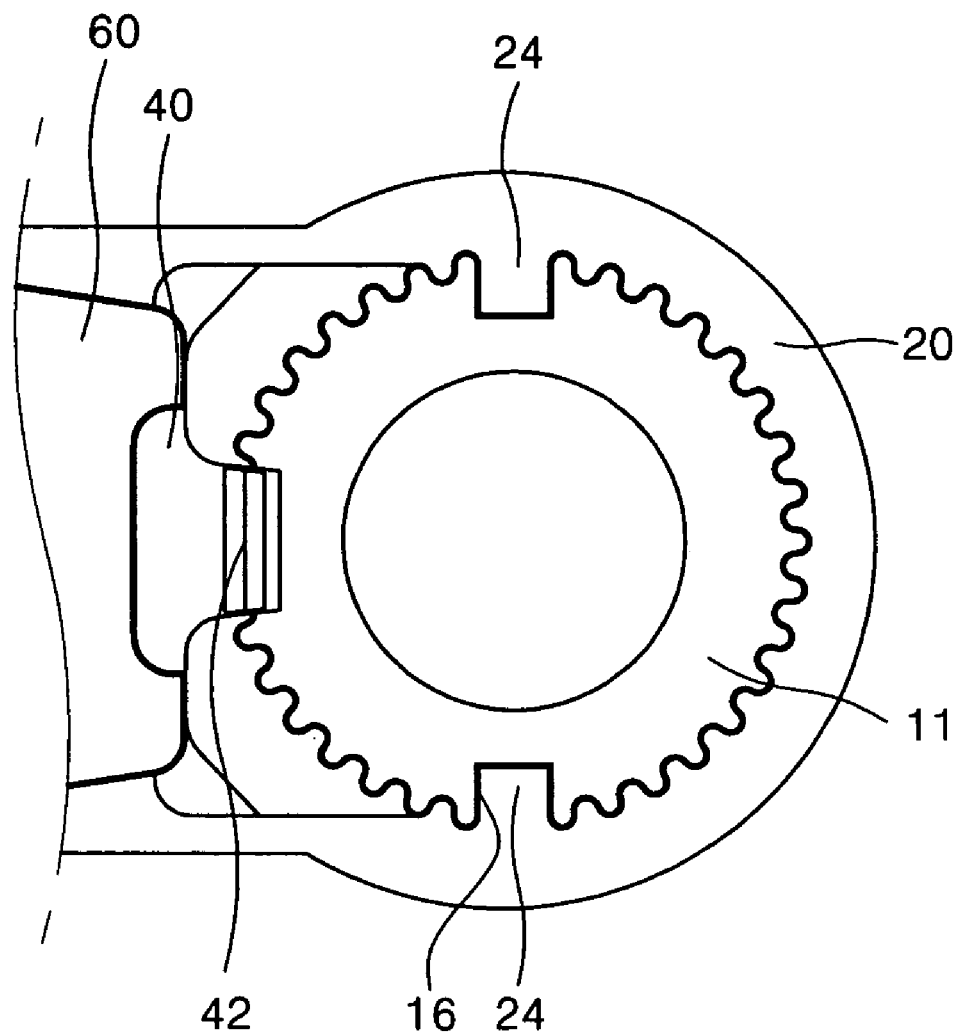
FIG. 5 is a bottom view of a part of the wiper assembly of FIG. 3.

The arm head 20 includes a shaft hole 22, a pair of keys 24, and guide pins 26. The shaft hole 22 is installed so that the shaft head 11 of the shaft 10 is inserted thereinto. The keys 24 are formed on the inner surface of the shaft hole 22 and each have a shape such that the keys 24 can fit in the key grooves 16 of the shaft 10. The inner surface of the shaft hole 22 of the arm head 20 is knurled such as to match with the knurled surface of the shaft head 11 as illustrated in FIG. 5. Hence, the shaft 10 and the arm head 20 can be strongly combined, and a rotating torque of the shaft 10 is delivered to the arm head 20 without loss.

Referring to FIG. 3, the guide pins 26 protrude downward from the arm head 20. The number of guide pins 26 is four.

One end of the arm 30 is combined with the arm head 20 using a rotating shaft 32, and the other end is combined with a wiper blade (not shown). A coupling spring 36 is installed so that the wiper blade can press down on a window of a vehicle.

A pair of pulling portions 54, which each have a hook shape, are formed on both sides of the arm 30.

The locking member 40 includes a stopper 42, four slots 44, and protrusions 52 and is installed in the arm head 20 such as to be able to slide between a locking location and an unlocking location.

The stopper 42 has a shape that can be caught by the notch 12 of the shaft head 11 of the shaft 10 so that the shaft 10 cannot be separated from the shaft hole 22 of the arm head 20. One end of the stopper 42 is curved downward at an angle very similar to the inclination of the aslant guide 14 of the shaft 10.

The four slots 44 extend long in the direction where the locking member 40 slides and individually correspond to the guide pins 26 on the bottom of the arm head 20. The slots 44 fit onto the guide pins 26 to guide sliding of the locking member 40.

When the arm 30 is pivoted while being folded, the protrusions 52 are caught by the pulling portions 54 of the arm 30 and move together with them.

Figure 6A:
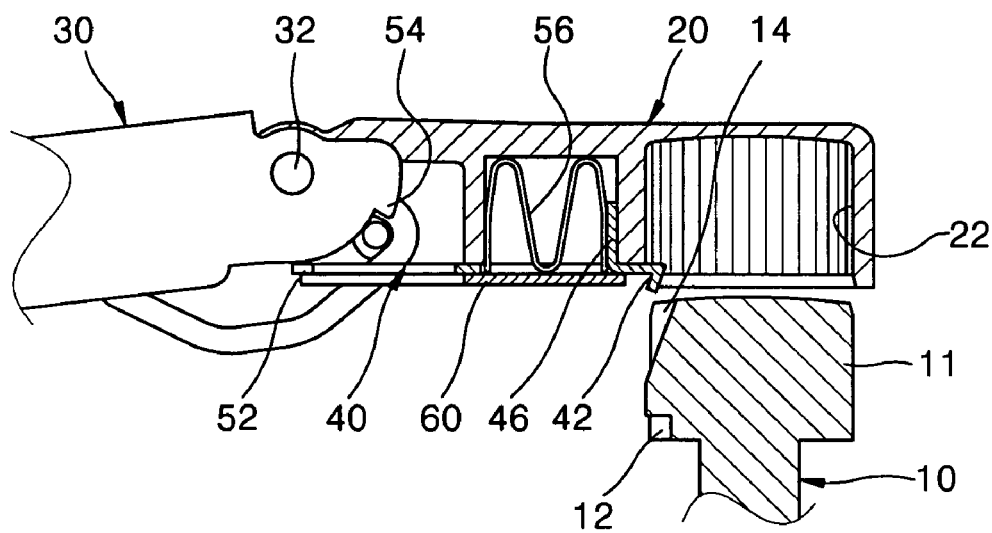
FIGS. 6A through 6E are cross-sectional views illustrating a method of assembling an arm head with a shaft in the wiper assembly of FIG. 3.

Referring to FIG. 6A, the locking location is the location of the locking member 40 where separation of the shaft 10 from the shaft hole 22 of the arm head 20 can be prevented by the stopper 42 locking in the notch 12 of the shaft 10.

Figure 7A:
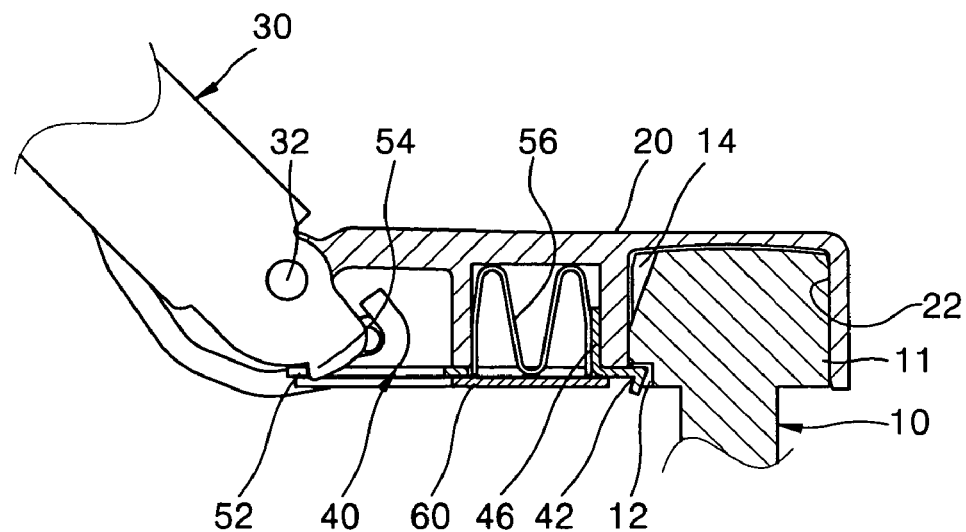
FIGS. 7A through 7D are cross-sectional views illustrating a method of separating a shaft from an arm head in the wiper assembly of FIG. 3.

Referring to FIG. 7A, the unlocking location is the location of the locking member 40 where the shaft 10 can be separated from the shaft hole 22 of the arm head 20 by unlocking the stopper 42 from the notch 12 of the shaft 10.

As shown in FIG. 4, the locking member 40 includes a support 46, which protrudes upward.

The locking member moving unit moves the locking member 40 from the locking location to the unlocking location and the vice versa by moving with a rotation of the arm 30. In the embodiment of FIGS. 3 and 4, the locking member moving unit includes the protrusions 52, the pulling portions 54, and a spring 56.

As described above, the protrusions 52 are formed on the locking member 40, and the pulling portions 54 are formed on the arm 30.

In the embodiment of FIGS. 3 and 4, the spring 56 is formed by folding an elastic member in a wave shape and biases the locking member 40 to have the locking location. Referring to FIGS. 6A through 6E and 7A through 7D, the spring 56 is installed within the arm head 20 while one end of the spring 56 is being supported by an internal wall of the arm head 20 and the other is being supported by the support 46 of the locking member 40.

The cover 60 is placed opposite to the arm head 20 based on the locking member 40 and fixed to the guide pins 26 by being screwed up into a hole of each of the guide pins 26 using screws 62. Consequently, the cover 60 is fixed to the bottom of the arm head 20 while having the locking member 40 sandwiched therebetween. Thereby, the cover 60 supports the locking member 40 and prevents the spring 56 installed within the arm head 20 from being detached down from arm head 20.

The combination and separation between the shaft 10 and the arm head 20 of the wiper assembly 1 of FIGS. 3 and 4 and effects thereof will now be described with reference to FIGS. 6A through 7D.

First, as shown in FIG. 6A, the shaft 10 is located under the shaft hole 22 of the arm head 20. At this time, the locking member 40 is placed at the locking position by an elastic force of the spring 56.

Figure 6B:
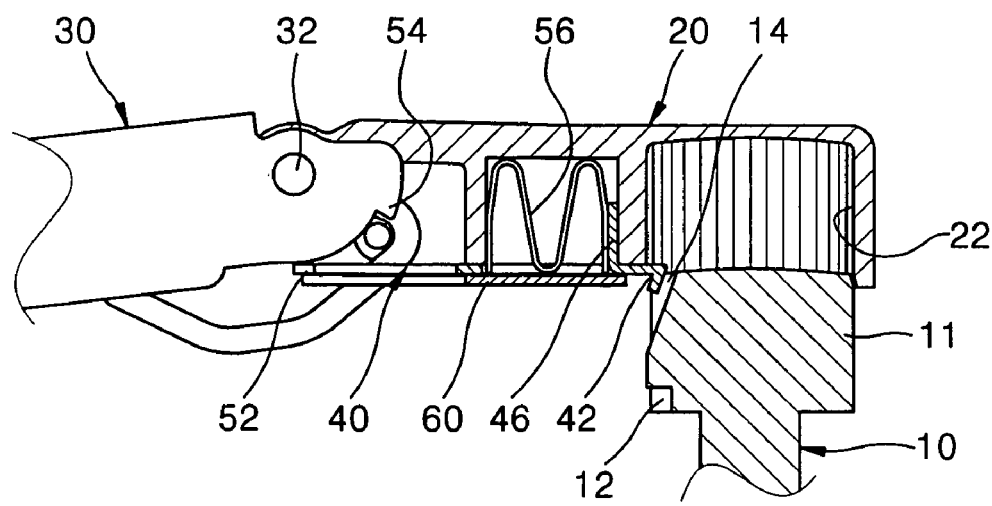

Next, as shown in FIG. 6B, the shaft 10 approaches the entrance of the shaft hole 22 of the arm head 20 such that the aslant guide 14 is right below the stopper 42 of the locking member 40. Since the shaft 10 has the two key grooves 16 and the shaft hole 22 has the two keys 24, the stopper 42 can easily align with the aslant guide 14 by interlocking the keys 24 into the key grooves 16.

Figure 6C:
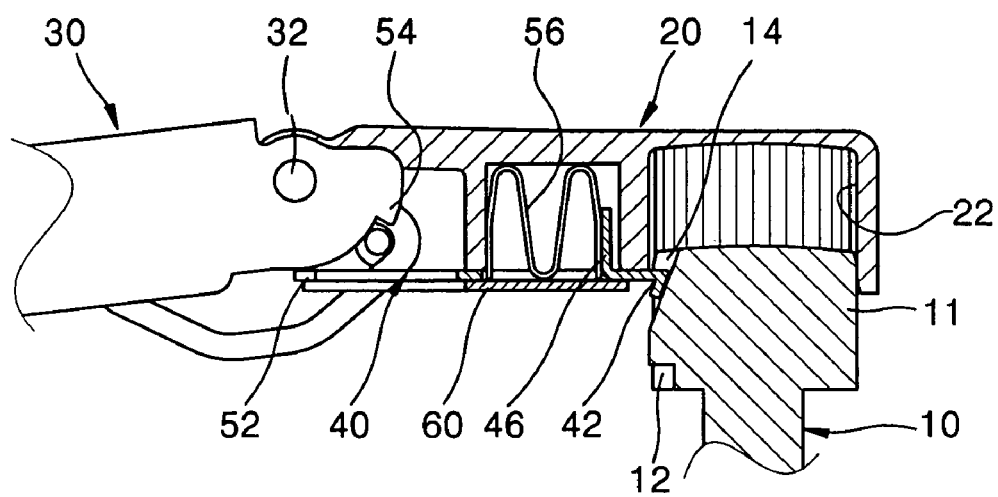

As shown in FIG. 6C, when the shaft head 11 of the shaft 10 is pushed into the shaft hole 22 of the arm head, the stopper 42 of the locking member 40 is pushed behind while sliding the aslant surface of the aslant guide 14. At this time, the spring 56 is pressed by the support 46 of the locking member 40. As the shaft 10 continues to enter the shaft hole 22, the locking member 40 slides to the unlocking location.

Figure 6D:
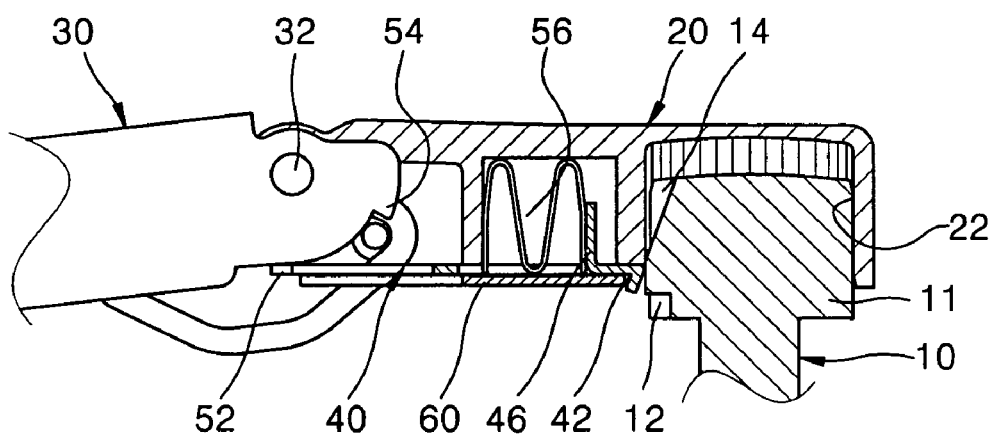

FIG. 6D illustrates the shaft hole 22 into which the shaft head 11 is nearly inserted. The stopper 42 is located on the outer circumference of the shaft head 11 after sliding the aslant guide 14, and the locking member 40 is positioned in the unlocking location.

Figure 6E:
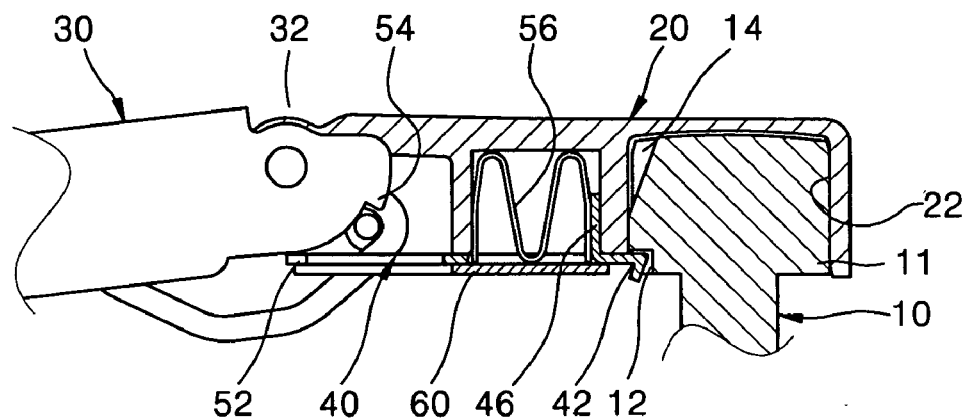

Finally, FIG. 6E illustrates the shaft hole 22 into which the shaft head 11 is completely inserted. The locking member 40 is restored to the locking location by a restoring force of the compressed spring 56. In other words, as the shaft head 11 fits completely into the shaft hole 22, the stopper 42 of the locking member 40 enters the notch 12 of the shaft 10, so that the locking member 40 is restored to the locking location by a restoring force of the spring 56 compressed by the support 46 of the locking member 40.

FIGS. 7A through 7D are cross-sectional views illustrating a method of separating the shaft 10 from the arm head 20 in the wiper assembly 1 of FIGS. 3 and 4. First, referring to FIG. 7A, the separation starts from the combination state shown in FIG. 6E. When the arm 30 starts pivoting around the rotating shaft 32 such as to be distant from the window of a vehicle and reaches a predetermined angle, the pulling portions 54 of the arm 30 come in contact with the protrusions 52 of the locking member 40.

Figure 7B:
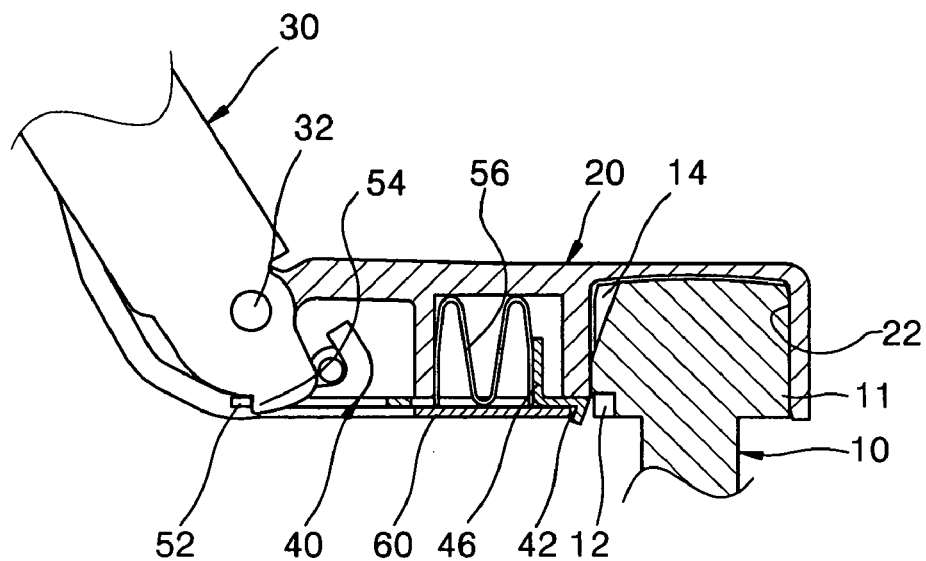

Referring to FIG. 7B, when the arm 30 moves further from the contact state of FIG. 7A, the pulling portions 54 of the arm 30 pulls the protrusions 52 back such that the locking 40 is positioned in the unlocking location.

Figure 7C:
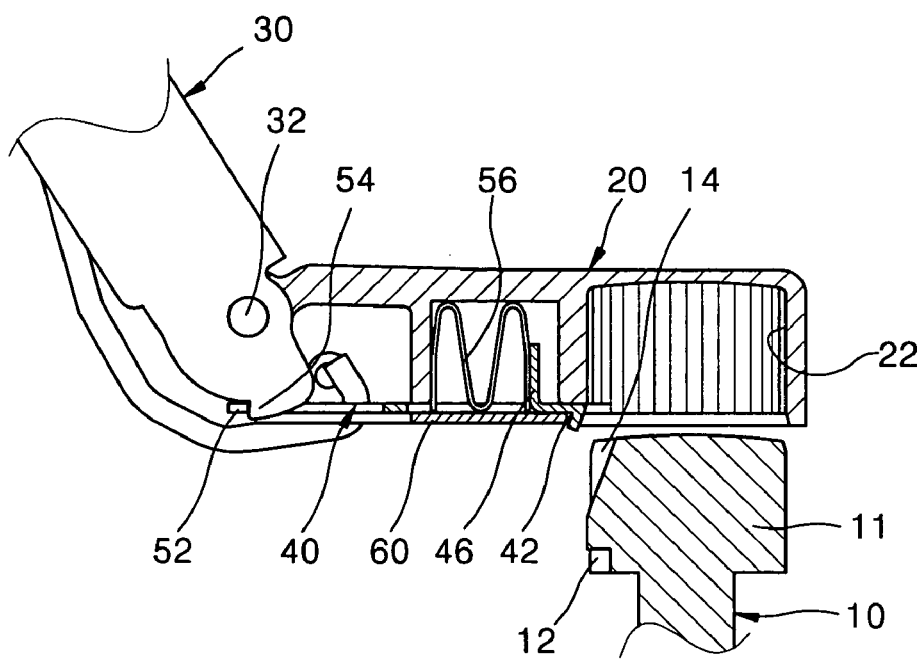
Figure 7D:
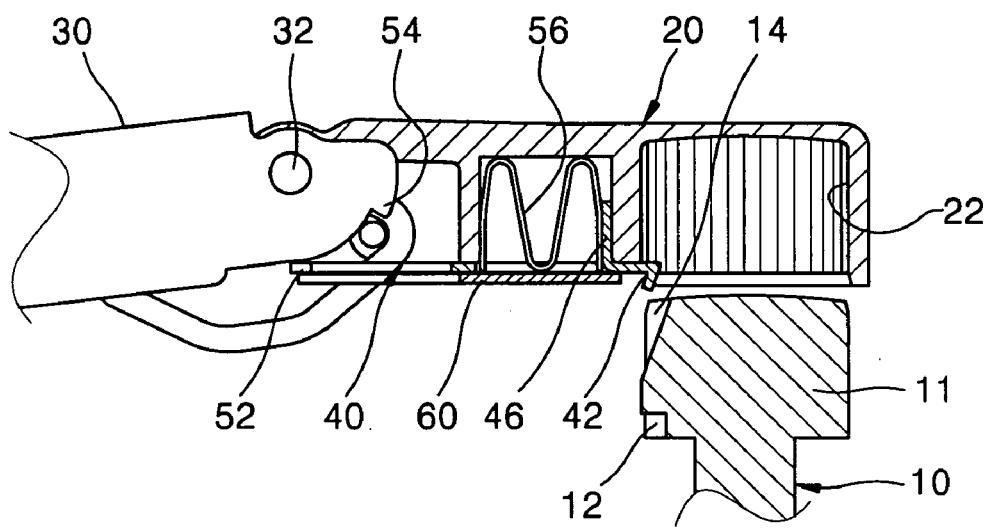

Hence, as shown in FIG. 7C, the shaft 10 is easily separated from the arm head 20. FIG. 7D shows the original unfolded state of the arm 30.

As described above, even an average user can combine the arm head 20 with the shaft 10 by simply pressing down the arm head 20 combined with the arm 30 on the shaft 10 using one hand. Also, he or she can easily separate the arm head 20 from the shaft 10 by simply folding the arm 30 using one hand and then lifting the arm head 20 from the shaft 10. Thus, the wiper assembly 1 of FIGS. 3 and 4 is operated much easier than a conventional wiper assembly requiring a user to use both hands to perform the separation or combination between a shaft and an arm head.

Although the arm head 20 is combined with the shaft 10 without folding the arm 30 in the above-described embodiment, this embodiment does not limit the present invention. In other words, even when the arm 30 is folded so that the locking member 40 enters in the unlocking state, the arm head 20 may be combined with the shaft 10, and then the arm 30 may be pivoted back toward the window of a vehicle.

In the wiper assembly 1, the shaft 10 and the shaft hole 2 are knurled, so they can be firmly combined with each other. Also, a rotating torque of the shaft 10 is transmitted to the arm head 20 without loss.

Figure 8:
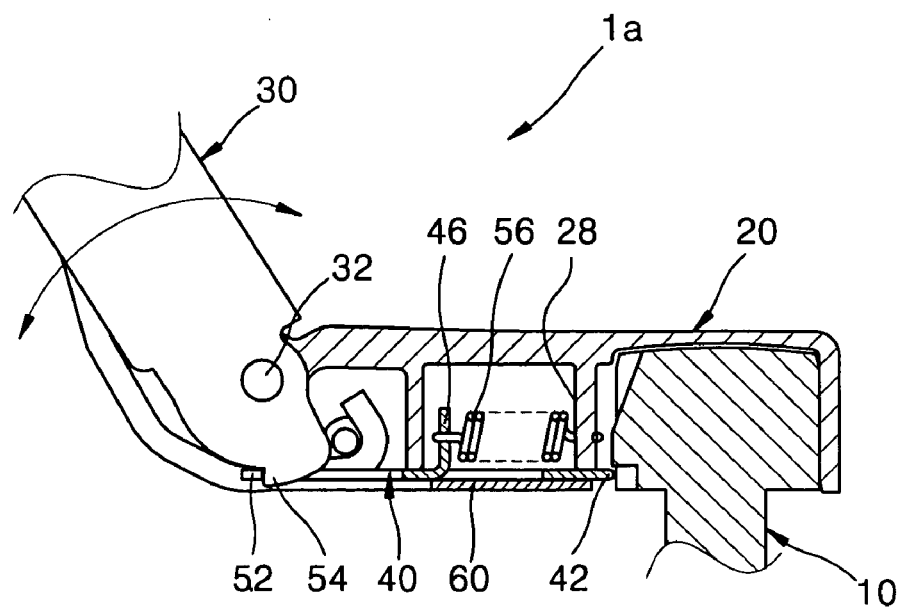
FIG. 8 is a schematic cross-sectional view of a wiper assembly according to another embodiment of the present invention.

FIG. 8 shows a wiper assembly 1a according to another embodiment of the present invention, which is different from the wiper assembly 1 in the shape of the spring 56 and the shapes of the support 46 and stopper 42 of the locking member 40. In the wiper assembly 1a, a coil spring is used as the spring 56, and the location of the support 46 is different from that of the wiper assembly 1. A spring support 28 for supporting one end of the coil spring 56 is further installed in the arm head 20.

The stopper 42 of FIG. 8 is simply straight in contrast with the curved shaped of the stopper 42 of FIGS. 3 and 4.

The combination and separation between the shaft 10 and the arm head 20 of the wiper assembly 1a and effects resulting from the combination and separation are almost the same as those of the wiper assembly 1.

Although the above-described two embodiments include the notch 12, the stopper 42, and the aslant guide 14, they do not limit the present invention but may be changed as long as providing the same effects as those of the above embodiments.

FIGS. 9A through 9E show a wiper assembly 1b according to still another embodiment of the present invention. The wiper assembly 1b is different from the wiper assemblies 1 and 1a in a locking member moving unit. That is to say, the locking member moving unit of the wiper assembly 1b includes protrusions 52, pulling portions 54, and a pushing portion 58 instead of the spring 56.

The protrusions 52 are included in the locking member 40, and their shape is the same as that of the embodiments of FIGS. 3 and 8. The pulling portions 54 are the same as those of the embodiment of FIGS. 3 and 4.

The pushing portion 58 is formed on the arm 30. When the arm 30 is pivoted around the rotating shaft 32 so as to be closer to the window of a vehicle, it pushes the protrusions 52 of the locking member 40. Hence, the locking member 40 is positioned at the locking location. In other words, in contrast with the wiper assemblies 1 and 1a where the locking member 40 is placed in the locking location by the spring 56, the locking member 40 of the wiper assembly 1b is placed in the locking location by the pushing portion 58 that pushes the protrusions 52 as the arm 30 pivots.

Figure 9A:
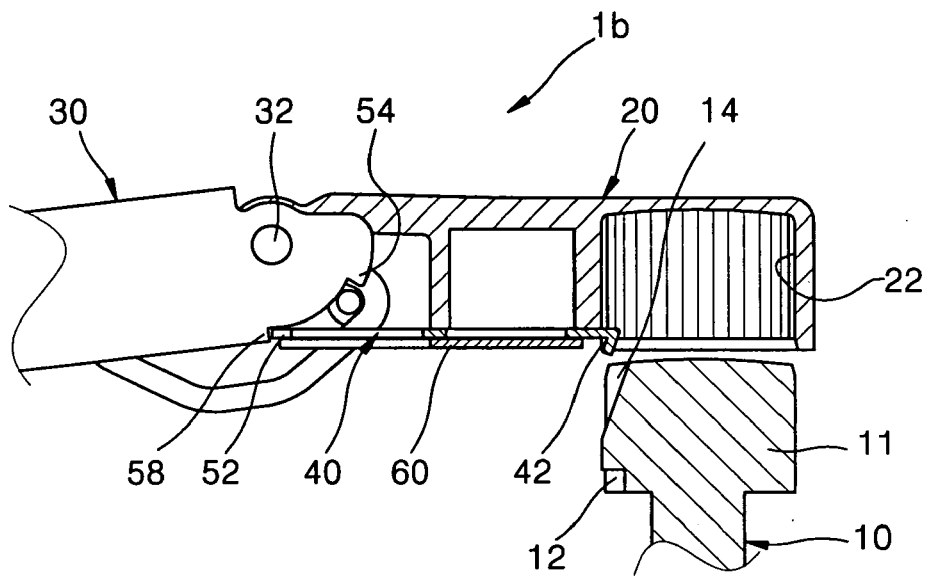
FIGS. 9A through 9E are cross-sectional views illustrating a method of combining or separating a shaft with or from an arm head in a wiper assembly according to still another embodiment of the present invention.

The combination of the shaft 10 and the arm head 20 of the wiper assembly 1b will now be described with reference to FIGS. 9A through 9E. Referring to FIG. 9A, the locking member 40 is placed in the locking location before the shaft 10 is combined with the arm head 20.

Figure 9B:
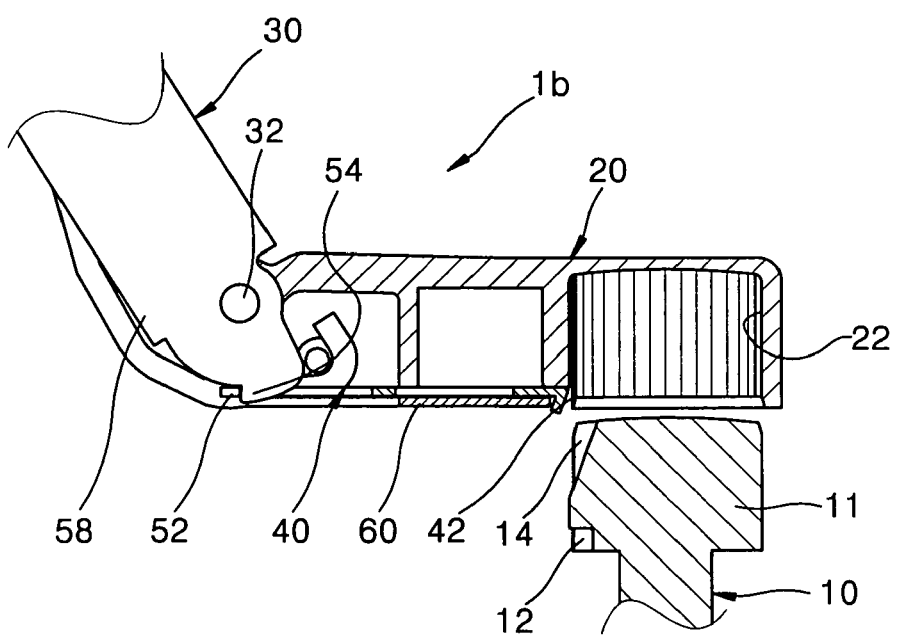

As shown in FIG. 9B, when the arm 30 is pivoted such as to be distant from the window of a vehicle before the shaft 10 is inserted into the shaft hole 22 of the arm head 20, the pulling portions 54 of the arm 30 are caught by the protrusions 52 of the locking member 40. When the arm 30 is further pivoted, the locking member 40 is placed in the unlocking location.

Figure 9C:
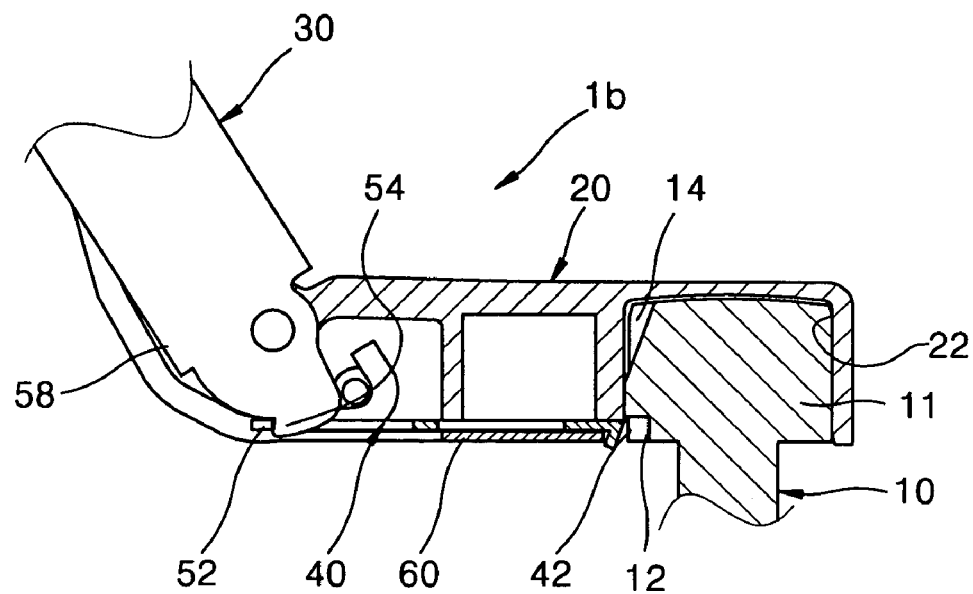

Thereafter, as shown in FIG. 9C, the shaft 10 is inserted into the shaft hole 22 of the arm head 20.

Figure 9D:
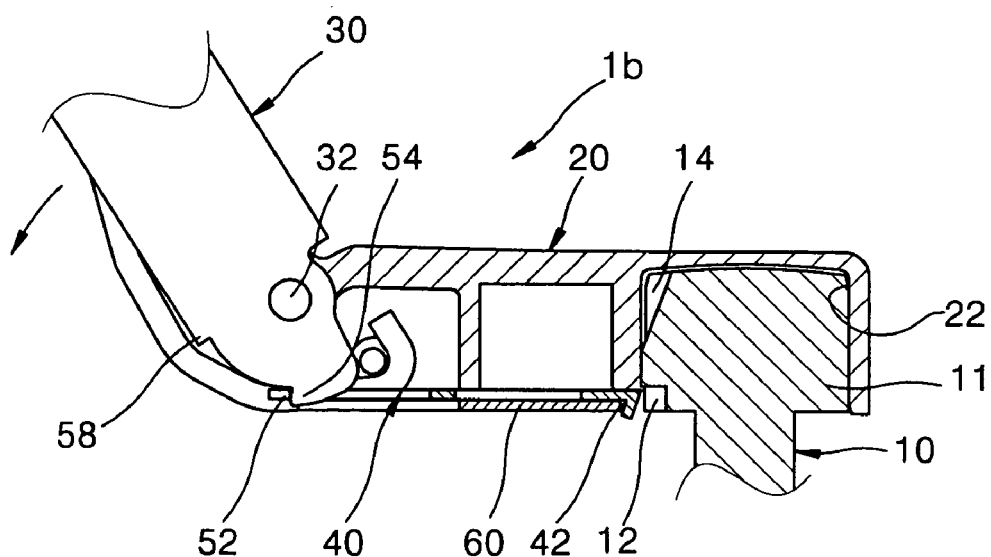

In FIG. 9D, the arm 30 is rotated to be closer to the window of a vehicle after the shaft 10 is inserted into the shaft hole 22. At this time, the locking member 40 not biased in contrast with the embodiments of FIGS. 3 and 8 is in the same location as in FIG. 9C. However, when the arm 30 is pivoted by a predetermined angle or greater, the locking member 40 is pushed by the pushing portion 54 of the arm 30 and slide into the locking location.

Figure 9E:
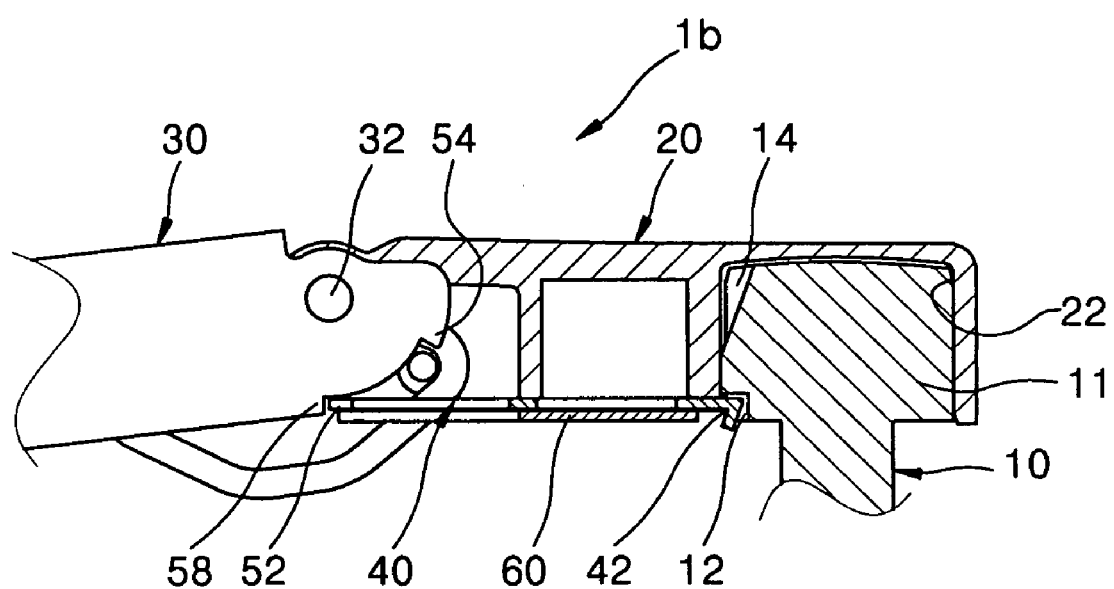

In FIG. 9E, the arm 30 is completely pivoted toward the window of a vehicle as in the original state of FIG. 9A, the shaft 10 is completely combined with the shaft hole 22. At this time, the motion of the locking member 40 sliding into the locking location is restricted by the pushing portion 58 of the arm 30 so that the locking member 40 is not detached from the notch 12 of the shaft 10.

Although a method of separating the arm head 20 from the shaft 10 is not shown in the drawings, it is executed by simply performing the steps of FIGS. 9A through 9E in an opposite order.

Since the wiper assembly 1*b* can sufficiently obtain the effects of the wiper assemblies 1 and 1*a*, the effects of the wiper assembly 1*b* will not be described herein.

As described above, combination and separation between a shaft and an arm head of a wiper assembly of the present invention can be simply performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper assembly including a shaft which is connected to a driving motor via a linkage and rotated by the driving motor, an arm head including a shaft hole into which the shaft is inserted, and an arm having one end combined with the arm head by a rotating shaft and rotatable about the rotating shaft and the other end combined with a wiper blade which wipes a window of a vehicle, the wiper assembly comprising:
   a locking member which is supported by the arm head and movable between a locking location where the locking member is locked in the shaft so that the shaft cannot be separated from the shaft hole of the arm head and an unlocking location where the locking member is unlocked, from the shaft so that the shaft can be separated from the shaft hole of the arm head; and
   a locking member moving unit which moves in response to a rotation of the arm so as to move the locking member between the locking location and the unlocking location, wherein:
   the locking member moving unit includes protrusions included in the locking member, pulling portions included in the arm, and a spring which biases the locking member so that the locking member is placed in the locking location;
   as the arm is pivoted about the rotating shaft such as to be distant from the window of the vehicle, the pulling portions of the arm catch and pull the protrusions of the locking member so that the locking member is placed from the locking location into the unlocking location; and
   as the arm is pivoted about the rotating shaft such as to be closer to the window of the vehicle, the locking member slides such as to be placed from the unlocking location into the locking location.

2. The wiper assembly of claim 1, wherein: the shaft includes a notch;
   the locking member includes a stopper capable of being locked in the notch of the shaft;
   an aslant guide is formed on an upper end of the shaft;
   when the stopper of the locking member is in the locking location and the shaft approaches the shaft hole of the arm head, the stopper of the locking member slides the aslant guide, elastically transforms the spring to retreat back to the unlocking location, and allows the shaft to enter the shaft hole of the arm head, and when the shaft is completely inserted into the shaft hole of the arm head, the locking member slides so as to be placed in the locking location by the spring.

3. The wiper assembly of claim 1, wherein the shaft includes key grooves formed in a length direction of the shaft, and the shaft hole of the arm head includes keys formed on an inner surface of the shaft hole and fitting onto the key grooves.

4. The wiper assembly of claim 1, wherein an outer lateral surface of the shaft and the inner surface of the shaft hole are knurled.

5. The wiper assembly of claim 1 wherein:
   a plurality of slots are formed in the locking member such as to elongate in the direction where the locking member slides;
   a cover is installed on a side of the locking member opposite to the arm head; and
   a plurality of guide pins which penetrate through the slots of the locking member and onto which the cover fits, wherein the locking member slides by being guided by the guide pins.

6. A wiper assembly including a shaft which is connected to a driving motor via a linkage and rotated by the driving motor, an arm head including a shaft hole into which the shaft is inserted, and an arm having one end combined with the arm head by a rotating shaft and rotatable about the rotating shaft and the other end combined with a wiper blade which wipes a window of a vehicle, the wiper assembly comprising:
   a locking member which is supported by the arm head and movable between a locking location where the locking member is locked in the shaft so that the shaft cannot be separated from the shaft hole of the arm head and an unlocking location where the locking member is unlocked from the shaft so that the shaft can be separated from the shaft hole of the arm head; and a locking member moving unit which moves in response to a rotation of the arm so as to move the locking member between the locking location and the unlocking location, wherein the locking member moving unit comprises:
   protrusions included in the locking member;
   pulling portions which pull the locking member by being hooked on the protrusions so that the locking member is placed in the unlocking location, when the arm is pivoted about the rotating shaft so as to be distant from the window of the vehicle; and
   pushing portions which push the protrusions so that the locking member is placed in the locking location, when the arm is pivoted about the rotating shaft so as to be closer to the window of the vehicle.

7. The wiper assembly of claim 6, wherein the shaft includes key grooves formed in a length direction of the shaft, and the shaft hole of the arm head includes keys formed on an inner surface of the shaft hole and fitting onto the key grooves.

8. The wiper assembly of claim 6, wherein an outer lateral surface of the shaft and the inner surface of the shaft hole are knurled.

9. The wiper assembly of claim 6, wherein:
   a plurality of slots are formed in the locking member such as to elongate in the direction where the locking member slides;
   a cover is installed on a side of the locking member opposite to the arm head; and
   a plurality of guide pins which penetrate through the slots of the locking member and onto which the cover fits, wherein the locking member slides by being guided by the guide pins.

* * * * *